United States Patent
Smith et al.

(10) Patent No.: US 8,778,246 B2
(45) Date of Patent: Jul. 15, 2014

(54) METHOD FOR PREPARING POLYURETHANE UREA-CONTAINING FILMS

(75) Inventors: Robert A. Smith, Murrysville, PA (US); Yingchao C. Zhang, Murrysville, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 746 days.

(21) Appl. No.: 12/573,231

(22) Filed: Oct. 5, 2009

(65) Prior Publication Data

US 2010/0109188 A1 May 6, 2010

Related U.S. Application Data

(60) Provisional application No. 61/110,291, filed on Oct. 31, 2008.

(51) Int. Cl.
*C08G 18/10* (2006.01)
*C08G 18/32* (2006.01)
*B29C 41/24* (2006.01)

(52) U.S. Cl.
CPC ............ *C08G 18/3225* (2013.01); *B29C 41/24* (2013.01)
USPC ........................................ 264/176.1; 264/165

(58) Field of Classification Search
CPC ............................. C08G 18/3225; B29C 41/24
USPC ....................................... 264/216, 165, 176.1
See application file for complete search history.

(56) References Cited

U.S. PATENT DOCUMENTS

| | | | |
|---|---|---|---|
| 2,644,007 A | 6/1953 | Irwin | |
| 2,680,127 A | 6/1954 | Slocombe et al. | |
| 2,908,703 A | 10/1959 | Latourette et al. | |
| 4,160,853 A | 7/1979 | Ammons | |
| 5,693,738 A | 12/1997 | Okazaki et al. | |
| 5,811,506 A | 9/1998 | Slagel | |
| 5,962,617 A | 10/1999 | Slagel | |
| 6,939,939 B2 * | 9/2005 | Slagel et al. | 528/55 |
| 7,009,032 B2 | 3/2006 | Bojkova et al. | |
| 2001/0028435 A1 | 10/2001 | Evans et al. | |
| 2003/0050423 A1 * | 3/2003 | Huebener et al. | 528/44 |
| 2010/0056746 A1 * | 3/2010 | Kajita et al. | 528/65 |

FOREIGN PATENT DOCUMENTS

JP 2008144154 A * 6/2008
WO WO 2007/146736 A2 12/2007

OTHER PUBLICATIONS

U.S. Appl. No. 12/573,218, Method for Preparing Polyurethane Urea-Containing Films filed Oct. 5, 2009.
Ullmann's Encyclopedia of Industrial Chemistry, Fifth Edition, 1992, vol. A21, pp. 673 to 674.

* cited by examiner

*Primary Examiner* — Galen Hauth
(74) *Attorney, Agent, or Firm* — Deborah M. Altman

(57) ABSTRACT

A method of preparing a polyurethane-containing film including:
(a) providing as a first component a polyurethane material having isocyanate functional groups;
(b) providing as a second component a material having active hydrogen functional groups reactive with isocyanate;
(c) combining the first component with a portion of the second component to form a first reaction mixture;
(d) allowing the first reaction mixture to react for a time sufficient to increase the viscosity to at least 300 cps;
(e) adding the remainder of the second component to the first reaction mixture to form a second reaction mixture;
(f) dispensing the reaction mixture onto a support substrate in a substantially uniform thickness to form an at least partial film thereon;
(g) heating the film on the support substrate to a temperature and for a time sufficient to yield a cured film; and
(h) removing the cured film from the support substrate to yield a non-elastomeric polyurethane-containing free film.

18 Claims, No Drawings

METHOD FOR PREPARING POLYURETHANE UREA-CONTAINING FILMS

CROSS-REFERENCE TO RELATED APPLICATIONS

This application claims the benefit of priority of U.S. Provisional Application No. 61/110,291, filed Oct. 31, 2008, which is incorporated by reference herein.

FIELD OF THE INVENTION

The present invention relates to methods of preparing a cured, non-elastomeric polyurethane urea-containing film.

BACKGROUND OF THE INVENTION

Polarizing optical elements that provide acceptable imaging qualities while maintaining durability and abrasion resistance are sought for a variety of applications, such as displays, windows, windshields, sunglasses, fashion lenses, non-prescription and prescription lenses, sport masks, face shields and goggles.

Conventional polarizing filters are formed from sheets or layers of a polymeric material such as polyvinyl alcohol that has been stretched or otherwise oriented and impregnated with an iodine chromophore or dichroic dye. Typically these impregnated sheets are layered between supporting films of cellulose triacetate or polyethylene terephthalate, which have good optical properties.

Polyurethane-containing materials such as polyurethane-ureas have been developed as useful polymers in the manufacture of optical articles because of their excellent properties such as low birefringence, resilience, and chemical and impact resistance. They have been used in mold castings for lenses, glazings, and the like. However, their use has been limited to these applications because of difficulties in preparing films of polyurethane-containing polymers. Such difficulties can include low gel time and high viscosity, thereby making conventional film casting of these materials very difficult due to poor workability.

Birefringence, or "double refraction", in cast films can be caused by the orientation of polymers during manufacturing operations. The molecular orientation of the polymers may lead to significantly different indices of refraction within the plane of the film. In-plane birefringence is the difference between these indices of refraction in perpendicular directions within the plane of the film. Optical materials with low or negligible birefringence can be desirable in certain optical articles, in particular, in combination with polarizing filters to provide good optical properties.

It would be desirable to provide a method of preparing polyurethane-containing materials in free films, for use as film layers in optical elements and articles, so as to take advantage of their superior optical and mechanical properties.

SUMMARY OF THE INVENTION

In accordance with the present invention, a method of preparing a cured, non-elastomeric polyurethane-containing film is provided. The method comprises:

(a) providing a first component comprising a polyurethane material having isocyanate functional groups;

(b) providing a second component comprising a material having active hydrogen functional groups that are reactive with isocyanate;

(c) combining the first component with a portion of the second component to form a first reaction mixture;

(d) allowing the first reaction mixture to react for a time sufficient to increase the viscosity of the reaction mixture to at least 300 cps;

(e) adding the remainder of the second component to the first reaction mixture to form a second reaction mixture;

(f) dispensing the second reaction mixture onto a support substrate in a substantially uniform thickness to form an at least partial film thereon;

(g) heating the film on the support substrate to a temperature and for a time sufficient to yield a cured film; and (h) removing the cured film from the support substrate to yield a non-elastomeric, polyurethane-containing free film.

Films formed using the method of the present invention are particularly useful as components of a liquid crystal display.

DETAILED DESCRIPTION OF THE INVENTION

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and other parameters used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

All numerical ranges herein include all numerical values and ranges of all numerical values within the recited numerical ranges. Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The various embodiments and examples of the present invention as presented herein are each understood to be non-limiting with respect to the scope of the invention.

As used in the following description and claims, the following terms have the indicated meanings:

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_5$ substituted acrylic acids, such as methacrylic acid, ethacrylic acid, etc., and their $C_1$-$C_5$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer.

The term "cure", "cured" or similar terms, as used in connection with a cured or curable composition, e.g., a "cured composition" of some specific description, means that at least a portion of the polymerizable and/or crosslinkable components that form the curable composition is at least partially polymerized and/or crosslinked. The term "curable", as used for example in connection with a curable film-forming composition, means that the indicated composition is polymerizable or cross linkable, e.g., by means that include, but are not limited to, thermal, catalytic, electron beam, chemical free-radical initiation, and/or photoinitiation such as by exposure to ultraviolet light or other actinic radiation. In the context of the present invention, a "cured" composition may continue to be further curable depending on the availability of polymerizable or crosslinkable components.

The term "non-elastomeric" refers to materials that do not exhibit typical elastomeric behavior; i.e., they do not readily undergo reversible deformation or elongation to at least twice their original length.

The terms "on", "appended to", "affixed to", "bonded to", "adhered to", or terms of like import means that the designated item, e.g., a coating, film or layer, is either directly connected to (superimposed on) the object surface, or indirectly connected to the object surface, e.g., through one or more other coatings, films or layers (superposed on).

The term "optical quality", as used for example in connection with polymeric materials, e.g., a "resin of optical quality" or "organic polymeric material of optical quality" means that the indicated material, e.g., a polymeric material, resin, or resin composition, is or forms a substrate, layer, film or coating that can be used as an optical article, such as an ophthalmic lens, or in combination with an optical article, because of its suitable optical properties.

The term "transparent", as used for example in connection with a substrate, film, material and/or coating, means that the indicated substrate, coating, film and/or material has the property of transmitting light without appreciable scattering so that objects lying beyond are entirely visible.

The phrase "an at least partial film" means an amount of film covering at least a portion, up to the complete surface of the substrate. A "film" is defined as a thin, substantially continuous layer of material that may be formed by a sheeting type of material or a coating type of material. As used herein, a "free film" comprises an article of self-sufficient structural integrity; that is, a thin sheet that is not necessarily in contact with and does not require a supporting substrate.

According to the present invention, a method of preparing a cured, non-elastomeric polyurethane-containing film is provided. The method comprises:

(a) providing a first component comprising a polyurethane material having isocyanate functional groups;

(b) providing a second component comprising a material having active hydrogen functional groups that are reactive with isocyanate;

(c) combining the first component with a portion of the second component to form a first reaction mixture;

(d) allowing the first reaction mixture to react for a time sufficient to increase the viscosity of the reaction mixture to at least 300 cps;

(e) adding the remainder of the second component to the first reaction mixture to form a second reaction mixture;

(f) dispensing the second reaction mixture onto a support substrate in a substantially uniform thickness to form an at least partial film thereon;

(g) heating the film on the support substrate to a temperature and for a time sufficient to yield a cured film; and (h) removing the cured film from the support substrate to yield a non-elastomeric, polyurethane-containing free film. The resulting free film typically is non-birefringent. In certain embodiments, depending on the materials used to prepare the polyurethane-containing material, the free film may demonstrate a stress at break of at least 9000 psi and a strain at break of at least 70 percent.

Suitable polyurethane materials having isocyanate functional groups for use in the first component may include polyurethane prepolymers derived from (i) polyisocyanates and (ii) materials having active hydrogen groups that are reactive with isocyanates.

Polyisocyanates useful in the preparation of the polyurethane material in the first component are numerous and widely varied. Non-limiting examples can include aliphatic polyisocyanates, cycloaliphatic polyisocyanates wherein one or more of the isocyanato groups are attached directly to the cycloaliphatic ring, cycloaliphatic polyisocyanates wherein one or more of the isocyanato groups are not attached directly to the cycloaliphatic ring, aromatic polyisocyanates wherein one or more of the isocyanato groups are attached directly to the aromatic ring, and aromatic polyisocyanates wherein one or more of the isocyanato groups are not attached directly to the aromatic ring, and mixtures thereof. When an aromatic polyisocyanate is used, generally care should be taken to select a material that does not cause the polyurethane-containing to color (e.g., yellow).

The polyisocyanate can include but is not limited to aliphatic or cycloaliphatic diisocyanates, aromatic diisocyanates, cyclic dimers and cyclic trimers thereof, and mixtures thereof. Non-limiting examples of suitable polyisocyanates can include Desmodur N 3300 (hexamethylene diisocyanate trimer) which is commercially available from Bayer; Desmodur N 3400 (60% hexamethylene diisocyanate dimer and 40% hexamethylene diisocyanate trimer). In a non-limiting embodiment, the polyisocyanate can include dicyclohexylmethane diisocyanate and isomeric mixtures thereof. As used herein and the claims, the term "isomeric mixtures" refers to a mixture of the cis-cis, trans-trans, and/or cis-trans isomers of the polyisocyanate. Non-limiting examples of isomeric mixtures for use in the present invention can include the trans-trans isomer of 4,4'-methylenebis(cyclohexyl isocyanate), hereinafter referred to as "PICM" (paraisocyanato cyclohexylmethane), the cis-trans isomer of PICM, the cis-cis isomer of PICM, and mixtures thereof.

Suitable isomers for use in the present invention include but are not limited to the following three isomers of 4,4'-methylenebis(cyclohexyl isocyanate).

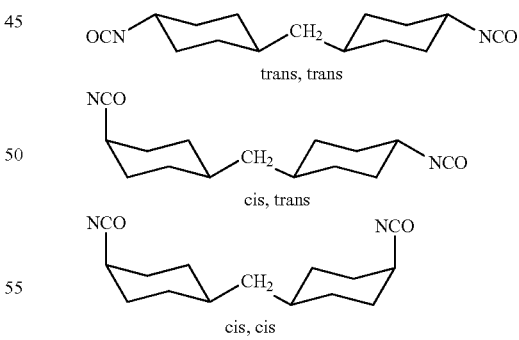

PICM can be prepared by phosgenating 4,4'-methylenebis (cyclohexyl amine) (PACM) by procedures well known in the art such as the procedures disclosed in U.S. Pat. Nos. 2,644,007; 2,680,127 and 2,908,703; which are incorporated herein by reference. The PACM isomer mixtures, upon phosgenation, can produce PICM in a liquid phase, a partially liquid phase, or a solid phase at room temperature. Alternatively, the PACM isomer mixtures can be obtained by the hydrogenation of methylenedianiline and/or by fractional crystallization of PACM isomer mixtures in the presence of water and alcohols such as methanol and ethanol.

Additional aliphatic and cycloaliphatic diisocyanates that can be used include 3-isocyanato-methyl-3,5,5-trimethyl cyclohexyl-isocyanate ("IPDI") which is commercially available from Arco Chemical, and meta-tetramethylxylene diisocyanate (1,3-bis(1-isocyanato-1-methylethyl)-benzene) which is commercially available from Cytec Industries Inc. under the trade name TMXDI® (Meta) Aliphatic Isocyanate.

As used herein and the claims, the term "aliphatic and cycloaliphatic diisocyanates" refers to 6 to 100 carbon atoms linked in a straight chain or cyclized having two diisocyanate reactive end groups. In a non-limiting embodiment of the present invention, the aliphatic and cycloaliphatic diisocyanates for use in the present invention can include TMXDI and compounds of the formula R—(NCO)$_2$ wherein R represents an aliphatic group or a cycloaliphatic group.

The material (ii) containing active hydrogens, used to prepare the polyurethane materials of the first component, may be any compound or mixture of compounds that contain active hydrogens that are reactive with isocyanates. Typically the active hydrogen-containing material (ii) comprises hydroxyl (OH) groups and/or, other active hydrogen groups reactive with isocyanate. The material (ii) may comprise a compound having at least two active hydrogen-containing groups comprising OH groups, primary amine groups, secondary amine groups, thiol groups, or combinations thereof. A single polyfunctional compound having OH groups may be used; likewise, a single polyfunctional compound having mixed functional groups may be used. Several different compounds may be used in admixture having the same or different functional groups; e.g., two different polyamines may be used, polythiols mixed with polyamines may be used, or polyamines mixed with hydroxyl functional polythiols, for example, are suitable.

Suitable OH-containing materials for use in the present invention in the preparation of the polyurethane material in the first component can include but are not limited to polyether polyols, polyester polyols, polycaprolactone polyols, polycarbonate polyols, and mixtures thereof.

Examples of polyether polyols are polyalkylene ether polyols which include those having the following structural formula:

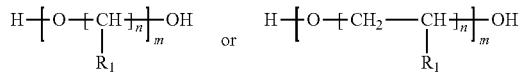

where the substituent R1 is hydrogen or lower alkyl containing from 1 to 5 carbon atoms including mixed substituents, and n is typically from 2 to 6 and m is from 8 to 100 or higher. Included are poly(oxytetramethylene)glycols, poly(oxytetraethylene)glycols, poly(oxy-1,2-propylene)glycols, and poly(oxy-1,2-butylene)glycols. Non-limiting examples of alkylene oxides can include ethylene oxide, propylene oxide, butylene oxide, amylene oxide, aralkylene oxides, such as but not limited to styrene oxide, mixtures of ethylene oxide and propylene oxide. In a further non-limiting embodiment, polyoxyalkylene polyols can be prepared with mixtures of alkylene oxide using random or step-wise oxyalkylation.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp.

Polyether glycols for use in the present invention can include but are not limited to polytetramethylene ether glycol.

The polyether-containing polyol can comprise block copolymers including blocks of ethylene oxide-propylene oxide and/or ethylene oxide-butylene oxide. Pluronic R, Pluronic L62D, Tetronic R and Tetronic, which are commercially available from BASF, can be used as the polyether-containing polyol material in the present invention.

Suitable polyester glycols can include but are not limited to the esterification products of one or more dicarboxylic acids having from four to ten carbon atoms, such as adipic, succinic or sebacic acids, with one or more low molecular weight glycols having from two to ten carbon atoms, such as ethylene glycol, propylene glycol, diethylene glycol, 1,4-butanediol, neopentyl glycol, 1,6-hexanediol and 1,10-decanediol. In a non-limiting embodiment, the polyester glycols can be the esterification products of adipic acid with glycols of from two to ten carbon atoms.

Suitable polycaprolactone glycols for use in the present invention can include the reaction products of E-caprolactone with one or more of the low molecular weight glycols listed above. A polycaprolactone may be prepared by condensing caprolactone in the presence of a difunctional active hydrogen compound such as water or at least one of the low molecular weight glycols listed above. Particular examples of polycaprolactone glycols include polycaprolactone polyesterdiols available as CAPA® 2047 and CAPA® 2077 from Solvay Corp.

Polycarbonate polyols are known in the art and are commercially available such as Ravecarb™ 107 (Enichem S.p.A.). In a non-limiting embodiment, the polycarbonate polyol can be produced by reacting an organic glycol such as a diol and a dialkyl carbonate, such as described in U.S. Pat. No. 4,160,853. In a non-limiting embodiment, the polyol can include polyhexamethyl carbonate having varying degrees of polymerization.

The glycol material can comprise low molecular weight polyols such as polyols having a molecular weight of less than 500, and compatible mixtures thereof. As used herein, the term "compatible" means that the glycols are mutually soluble in each other so as to form a single phase. Non-limiting examples of these polyols can include low molecular weight diols and triols. If used, the amount of triol is chosen so as to avoid a high degree of cross-linking in the polyurethane. A high degree of cross-linking can result in a curable polyurethane that is not formable by moderate heat and pressure. The organic glycol typically contains from 2 to 16, or from 2 to 6, or from 2 to 10, carbon atoms. Non-limiting examples of such glycols can include ethylene glycol, propylene glycol, diethylene glycol, triethylene glycol, tetraethylene glycol, dipropylene glycol, tripropylene glycol, 1,2-, 1,3- and 1,4-butanediol, 2,2,4-trimethyl-1,3-pentanediol, 2-methyl-1,3-pentanediol, 1,3-2,4- and 1,5-pentanediol, 2,5- and 1,6-hexanediol, 2,4-heptanediol, 2-ethyl-1,3-hexanediol, 2,2-dimethyl-1,3-propanediol, 1,8-octanediol, 1,9-nonanediol, 1,10-decanediol, 1,4-cyclohexanediol, 1,4-cyclohexanedimethanol, 1,2-bis(hydroxyethyl)-cyclohexane, glycerin, tetramethylolmethane, such as but not limited to pentaerythritol, trimethylolethane and trimethylolpropane; and isomers thereof.

The OH-containing material can have a weight average molecular weight, for example, of at least 60, or at least 90, or at least 200. Additionally, the OH-containing material can have a weight average molecular weight, for example, of less than 10,000, or less than 7000, or less than 5000, or less than 2000.

The OH-containing material for use in the present invention can include teresters produced from at least one low molecular weight dicarboxylic acid, such as adipic acid.

Polyester glycols and polycaprolactone glycols for use in the present invention can be prepared using known esterification or transesterification procedures as described, for example, in the article D. M. Young, F. Hostettler et al., "Polyesters from Lactone," Union Carbide F-40, p. 147.

Polyester glycols can also be prepared from the reaction of 1,6-hexanediol and adipic acid; 1,10-decandiol and adipic acid; or 1,10-decanediol and caprolactone.

In alternate non-limiting embodiments, the OH-containing material for use in the present invention can be chosen from: (a) esterification product of adipic acid with at least one diol selected from 1,4-butanediol, 1,6-hexanediol, neopentyl glycol, or 1,10-decanediol; (b) reaction product of E-caprolactone with at least one diol selected from 1,4-butane diol, 1,6-hexane diol, neopentyl glycol, or 1,10-decanediol; (c) polytetramethylene glycol; (d) aliphatic polycarbonate glycols, and (e) mixtures thereof.

Thiol-containing materials may be used to produce a prepolymer such as a sulfur-containing isocyanate-functional polyurethane for the preparation of high index polyurethane-containing films; i.e., films having a relatively high refractive index. Note that in these embodiments the polyurethane prepolymer used as the first component may contain disulfide linkages due to disulfide linkages contained in the polythiol and/or polythiol oligomer used to prepare the polyurethane prepolymer.

Thiol-containing materials may have at least two thiol functional groups and may comprise a dithiol, or a mixture of a dithiol and a compound having more than two thiol functional groups (higher polythiol). Such mixtures may include mixtures of dithiols and/or mixtures of higher polythiols. The thiol functional groups are typically terminal groups, though a minor portion (i.e., less than 50 percent of all groups) may be pendant along a chain. The compound (a) may additionally contain a minor portion of other active hydrogen functionality (i.e., different from thiol), for example, hydroxyl functionality. Thiol-containing materials may be linear or branched, and may contain cyclic, alkyl, aryl, aralkyl, or alkaryl groups.

Thiol-containing materials may be selected so as to produce a substantially linear oligomeric polythiol. Therefore, the material comprises a mixture of a dithiol and a compound having more than two thiol functional groups, the compound having more than two thiol functional groups can be present in an amount up to 10 percent by weight of the mixture.

Suitable dithiols can include linear or branched aliphatic, cycloaliphatic, aromatic, heterocyclic, polymeric, oligomeric dithiols and mixtures thereof. The dithiol can comprise a variety of linkages including but not limited to ether linkages (—O—), sulfide linkages (—S—), polysulfide linkages (—$S_x$—, wherein x is at least 2, or from 2 to 4) and combinations of such linkages.

Non-limiting examples of suitable dithiols for use in the present invention can include but are not limited to 2,5-dimercaptomethyl-1,4-dithiane, dimercaptodiethylsulfide (DMDS), ethanedithiol, 3,6-dioxa-1,8-octanedithiol, ethylene glycol di(2-mercaptoacetate), ethylene glycol di(3-mercaptopropionate), poly(ethylene glycol) di(2-mercaptoacetate) and poly(ethylene glycol) di(3-mercaptopropionate), benzenedithiol, 4-tert-butyl-1,2-benzenedithiol, 4,4'-thiodibenzenethiol, and mixtures thereof.

The dithiol may include dithiol oligomers having disulfide linkages such as materials represented by the following formula:

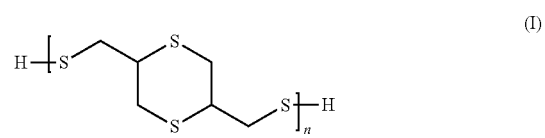

wherein n can represent an integer from 1 to 21.

Dithiol oligomers represented by Formula I can be prepared, for example, by the reaction of 2,5-dimeracaptomethyl-1,4-dithiane with sulfur in the presence of basic catalyst, as known in the art.

The nature of the SH group in polythiols is such that oxidative coupling can occur readily, leading to formation of disulfide linkages. Various oxidizing agents can lead to such oxidative coupling. The oxygen in the air can in some cases lead to such oxidative coupling during storage of the polythiol. It is believed that a possible mechanism for the oxidative coupling of thiol groups involves the formation of thiyl radicals, followed by coupling of said thiyl radicals, to form disulfide linkage. It is further believed that formation of disulfide linkage can occur under conditions that can lead to the formation of thiyl radical, including but not limited to reaction conditions involving free radical initiation. The polythiols can include species containing disulfide linkages formed during storage.

The polythiols for use in material (ii) in the preparation of the polyurethane material in the first component can also include species containing disulfide linkages formed during synthesis of the polythiol.

In certain embodiments, the dithiol for use in the present invention, can include at least one dithiol represented by the following structural formulas:

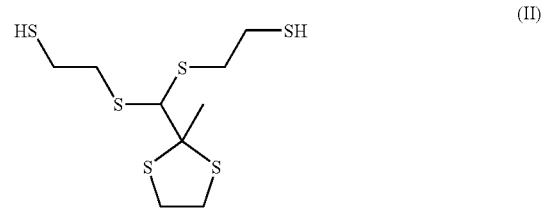

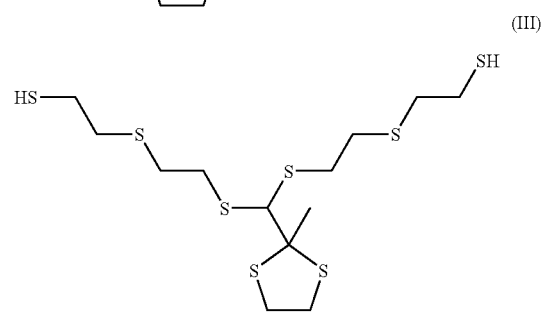

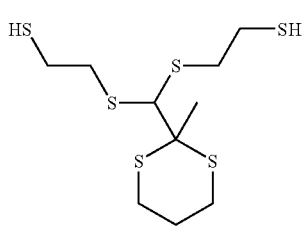
(IV)

(V)

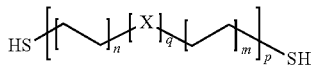
VII wherein X can represent O, S or Se, n can be an integer from 0 to 10, m can be an integer from 0 to 10, p can be an integer from 1 to 10, q can be an integer from 0 to 3, and with the proviso that (m+n) is an integer from 1 to 20.

Non-limiting examples of suitable dimercaptoalkylsulfides for use in the present invention can include branched dimercaptoalkylsulfides.

The amount of dimercaptan, dimercaptoalkylsulfide, or mixtures thereof, suitable for reacting with the reaction product of asym-dichloroacetone and dimercaptan, can vary. Typically, dimercaptan, dimercaptoalkylsulfide, or a mixture thereof, can be present in the reaction mixture in an amount such that the equivalent ratio of reaction product to dimercaptan, dimercaptoalkylsulfide, or a mixture thereof, can be from 1:1.01 to 1:2. Moreover, suitable temperatures for carrying out this reaction can vary within the range of from 0 to 100° C.

The reaction of asym-dichloroacetone with dimercaptan can be carried out in the presence of an acid catalyst. The acid catalyst can be selected from a wide variety known in the art, such as but not limited to Lewis acids and Bronsted acids. Non-limiting examples of suitable acid catalysts can include those described in Ullmann's Encyclopedia of Industrial Chemistry, $5^{th}$ Edition, 1992, Volume A21, pp. 673 to 674. The acid catalyst is often chosen from boron trifluoride etherate, hydrogen chloride, toluenesulfonic acid, and mixtures thereof. The amount of acid catalyst can vary from 0.01 to 10 percent by weight of the reaction mixture.

The reaction product of asym-dichloroacetone and dimercaptan can alternatively be reacted with dimercaptoalkylsulfide, dimercaptan or mixtures thereof, in the presence of a base. The base can be selected from a wide variety known in the art, such as but not limited to Lewis bases and Bronsted bases. Non-limiting examples of suitable bases can include those described in Ullmann's Encyclopedia of Industrial Chemistry, $5^{th}$ Edition, 1992, Volume A21, pp. 673 to 674. The base is often sodium hydroxide. The amount of base can vary. Typically, a suitable equivalent ratio of base to reaction product of the first reaction, can be from 1:1 to 10:1.

The reaction of asym-dichloroacetone with dimercaptan can be carried out in the presence of a solvent. The solvent can be selected from but is not limited to organic solvents. Non-limiting examples of suitable solvents can include but are not limited to chloroform, dichloromethane, 1,2-dichloroethane, diethyl ether, benzene, toluene, acetic acid and mixtures thereof.

In another embodiment, the reaction product of asym-dichloroacetone and dimercaptan can be reacted with dimercaptoalkylsulfide, dimercaptan or mixtures thereof, with or without the presence of a solvent, wherein the solvent can be selected from but is not limited to organic solvents. Non-limiting examples of suitable organic solvents can include alcohols such as but not limited to methanol, ethanol and propanol; aromatic hydrocarbon solvents such as but not limited to benzene, toluene, xylene; ketones such as but not limited to methyl ethyl ketone; water; and mixtures thereof.

The reaction of asym-dichloroacetone with dimercaptan can also be carried out in the presence of a dehydrating reagent. The dehydrating reagent can be selected from a wide variety known in the art. Suitable dehydrating reagents for use in this reaction can include but are not limited to magnesium The sulfide-containing dithiols comprising 1,3-dithiolane (e.g., formulas II and III) or 1,3-dithiane (e.g., formulas IV and V) can be prepared by reacting asym-dichloroacetone with dimercaptan, and then reacting the reaction product with dimercaptoalkylsulfide, dimercaptan or mixtures thereof, as described in U.S. Pat. No. 7,009,032 B2.

Non-limiting examples of suitable dimercaptans for use in the reaction with asym-dichloroacetone can include but are not limited to materials represented by the following formula:

VI wherein Y can represent $CH_2$ or $(CH_2-S-CH_2)$, and n can be an integer from 0 to 5. The dimercaptan for reaction with asym-dichloroacetone in the present invention can be chosen from, for example, ethanedithiol, propanedithiol, and mixtures thereof.

The amount of asym-dichloroacetone and dimercaptan suitable for carrying out the above reaction can vary. For example, asym-dichloroacetone and dimercaptan can be present in the reaction mixture in an amount such that the molar ratio of dichloroacetone to dimercaptan can be from 1:1 to 1:10.

Suitable temperatures for reacting asym-dichloroacetone with dimercaptan can vary, often ranging from 0 to 100° C.

Non-limiting examples of suitable dimercaptans for use in the reaction with the reaction product of the asym-dichloroacetone and dimercaptan, can include but are not limited to materials represented by the above general formula VI, aromatic dimercaptans, cycloalkyl dimercaptans, heterocyclic dimercaptans, branched dimercaptans, and mixtures thereof.

Non-limiting examples of suitable dimercaptoalkylsulfides for use in the reaction with the reaction product of the asym-dichloroacetone and dimercaptan, can include materials represented by the following formula:

sulfate. The amount of dehydrating reagent can vary widely according to the stoichiometry of the dehydrating reaction.

The polythiols for use in material (II) in the preparation of the polyurethane material in the first component can be prepared in certain non-limiting embodiments by reacting 2-methyl-2-dichloromethyl-1,3-dithiolane with dimercaptodiethylsulfide to produce dimercapto-1,3-dithiolane derivative of formula III. Alternatively, 2-methyl-2-dichloromethyl-1,3-dithiolane can be reacted with 1,2-ethanedithiol to produce dimercapto-1,3-dithiolane derivative of formula II. 2-methyl-2-dichloromethyl-1,3-dithiane can be reacted with dimercaptodiethylsulfide to produce dimercapto-1,3-dithiane derivative of formula V. Also, 2-methyl-2-dichloromethyl-1,3-dithiane can be reacted with 1,2-ethanedithiol to produce dimercapto-1,3-dithiane derivative of formula IV.

Another non-limiting example of a dithiol suitable for use as the material (ii) can include at least one dithiol oligomer prepared by reacting dichloro derivative with dimercaptoalkylsulfide as follows:

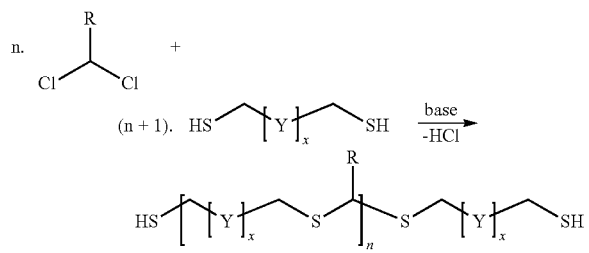

wherein R can represent $CH_3$, $CH_3CO$, $C_1$ to $C_{10}$ alkyl, cycloalkyl, aryl alkyl, or alkyl-CO; Y can represent $C_1$ to $C_{10}$ alkyl, cycloalkyl, $C_6$ to $C_{14}$ aryl, $(CH_2)_p(S)_m(CH_2)_q$, $(CH_2)_p(Se)_m(CH_2)_q$, $(CH_2)_p(Te)_m(CH_2)_q$ wherein m can be an integer from 1 to 5 and, p and q can each be an integer from 1 to 10; n can be an integer from 1 to 20; and x can be an integer from 0 to 10.

The reaction of dichloro derivative with dimercaptoalkylsulfide can be carried out in the presence of a base. Suitable bases include any known to those skilled in the art in addition to those disclosed above.

The reaction of dichloro derivative with dimercaptoalkylsulfide may be carried out in the presence of a phase transfer catalyst. Suitable phase transfer catalysts for use in the present invention are known and varied. Non-limiting examples can include but are not limited to tetraalkylammonium salts and tetraalkylphosphonium salts. This reaction is often carried out in the presence of tetrabutylphosphonium bromide as phase transfer catalyst. The amount of phase transfer catalyst can vary widely, from 0 to 50 equivalent percent, or from 0 to 10 equivalent percent, or from 0 to 5 equivalent percent, relative to the dimercaptosulfide reactants.

The polythiols for use in material (ii) may further contain hydroxyl functionality. Non-limiting examples of suitable materials having both hydroxyl and multiple (more than one) thiol groups can include but are not limited to glycerin bis(2-mercaptoacetate), glycerin bis(3-mercaptopropionate), 1,3-dimercapto-2-propanol, 2,3-dimercapto-1-propanol, trimethylolpropane bis(2-mercaptoacetate), trimethylolpropane bis(3-mercaptopropionate), pentaerythritol bis(2-mercaptoacetate), pentaerythritol tris(2-mercaptoacetate), pentaerythritol bis(3-mercaptopropionate), pentaerythritol tris(3-mercaptopropionate), and mixtures thereof.

In addition to dithiols disclosed above, particular examples of suitable dithiols can include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide (DMDS), methyl-substituted dimercaptodiethylsulfide, dimethyl-substituted dimercaptodiethylsulfide, 3,6-dioxa-1,8-octanedithiol, 1,5-dimercapto-3-oxapentane, 2,5-dimercaptomethyl-1,4-dithiane (DMMD), ethylene glycol di(2-mercaptoacetate), ethylene glycol di(3-mercaptopropionate), and mixtures thereof.

Suitable trifunctional or higher-functional polythiols for use in material (ii) can be selected from a wide variety known in the art. Non-limiting examples can include pentaerythritol tetrakis(2-mercaptoacetate), pentaerythritol tetrakis(3-mercaptopropionate), trimethylolpropane tris(2-mercaptoacetate), trimethylolpropane tris(3-mercaptopropionate), and/or thioglycerol bis(2-mercaptoacetate).

For example, the polythiol can be chosen from materials represented by the following general formula,

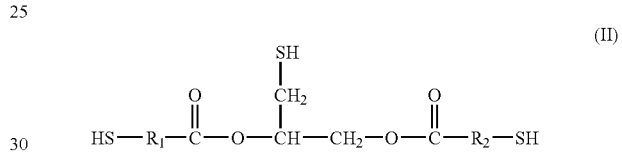

wherein $R_1$ and $R_2$ can each be independently chosen from straight or branched chain alkylene, cyclic alkylene, phenylene and $C_1$-$C_9$ alkyl substituted phenylene. Non-limiting examples of straight or branched chain alkylene can include methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Non-limiting examples of cyclic alkylenes can include cyclopentylene, cyclohexylene, cycloheptylene, cyclooctylene, and alkyl-substituted derivatives thereof. The divalent linking groups $R_1$ and $R_2$ can be chosen from methylene, ethylene, phenylene, and alkyl-substituted phenylene, such as methyl, ethyl, propyl, isopropyl and nonyl substituted phenylene.

In particular embodiments, a polythiol may be prepared by reacting together (1) any of the dithiols mentioned above, and (2) a compound having at least two double bonds (for example, a diene).

The compound (2) having at least two double bonds can be chosen from non-cyclic dienes, including straight chain and/or branched aliphatic non-cyclic dienes, non-aromatic ring-containing dienes, including non-aromatic ring-containing dienes wherein the double bonds can be contained within the ring or not contained within the ring or any combination thereof, and wherein the non-aromatic ring-containing dienes can contain non-aromatic monocyclic groups or non-aromatic polycyclic groups or combinations thereof; aromatic ring-containing dienes; or heterocyclic ring-containing dienes; or dienes containing any combination of such non-cyclic and/or cyclic groups. The dienes can optionally contain thioether, disulfide, polysulfide, sulfone, ester, thioester, carbonate, thiocarbonate, urethane, or thiourethane linkages, or halogen substituents, or combinations thereof; with the proviso that the dienes contain double bonds capable of undergoing reaction with SH groups of a polythiol, and forming covalent C—S bonds. Often the compound (2) having at least two double bonds comprises a mixture of dienes that are different from one another.

The compound (2) having at least two double bonds may comprise acyclic non-conjugated dienes, acyclic polyvinyl ethers, allyl-(meth)acrylates vinyl-(meth)acrylates, di(meth)acrylate esters of diols, di(meth)acrylate esters of dithiols, di(meth)acrylate esters of poly(alkyleneglycol) diols, monocyclic non-aromatic dienes, polycyclic non-aromatic dienes, aromatic ring-containing dienes, diallyl esters of aromatic ring dicarboxylic acids, divinyl esters of aromatic ring dicarboxylic acids, and/or mixtures thereof.

Non-limiting examples of acyclic non-conjugated dienes can include those represented by the following general formula:

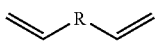

wherein R can represent $C_1$ to $C_{30}$ linear or branched divalent saturated alkylene radical, or $C_2$ to $C_{30}$ divalent organic radical including groups such as but not limited to those containing ether, thioether, ester, thioester, ketone, polysulfide, sulfone and combinations thereof. The acyclic non-conjugated dienes can be selected from 1,5-hexadiene, 1,6-heptadiene, 1,7-octadiene and mixtures thereof.

Non-limiting examples of suitable acyclic polyvinyl ethers can include those represented by the following structural formula:

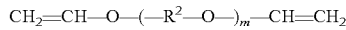

wherein $R^2$ can be $C_2$ to $C_6$ n-alkylene, $C_3$ to $C_6$ branched alkylene group, or —[(CH$_2$—)$_p$—O—]$_q$—(—CH$_2$—)$_r$—, m can be a rational number from 0 to 10, often 2; p can be an integer from 2 to 6, q can be an integer from 1 to 5 and r can be an integer from 2 to 10.

Non-limiting examples of suitable polyvinyl ether monomers for use can include divinyl ether monomers, such as ethylene glycol divinyl ether, diethylene glycol divinyl ether, triethyleneglycol divinyl ether, and mixtures thereof.

Di(meth)acrylate esters of linear diols can include ethanediol di(meth)acrylate, 1,3-propanediol dimethacrylate, 1,2-propanediol di(meth)acrylate, 1,4-butanediol di(meth)acrylate, 1,3-butanediol di(meth)acrylate, 1,2-butanediol di(meth)acrylate, and mixtures thereof.

Di(meth)acrylate esters of dithiols can include, for example, di(meth)acrylate of 1,2-ethanedithiol including oligomers thereof, di(meth)acrylate of dimercaptodiethyl sulfide (i.e., 2,2'-thioethanedithiol di(meth)acrylate) including oligomers thereof, di(meth)acrylate of 3,6-dioxa-1,8-octanedithiol including oligomers thereof, di(meth)acrylate of 2-mercaptoethyl ether including oligomers thereof, di(meth)acrylate of 4,4'-thiodibenzenethiol, and mixtures thereof.

Further non-limiting examples of suitable dienes can include monocyclic aliphatic dienes such as those represented by the following structural formula:

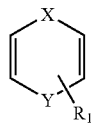

wherein X and Y each independently can represent $C_{1-10}$ divalent saturated alkylene radical; or $C_{1-5}$ divalent saturated alkylene radical, containing at least one element selected from the group of sulfur, oxygen and silicon in addition to the carbon and hydrogen atoms; and $R_1$ can represent H, or $C_1$-$C_{10}$ alkyl; and

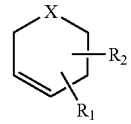

wherein X and $R_1$ can be as defined above and $R_2$ can represent $C_2$-$C_{10}$ alkenyl. The monocyclic aliphatic dienes can include 1,4-cyclohexadiene, 4-vinyl-1-cyclohexene, dipentene and terpinene.

Non-limiting examples of polycyclic aliphatic dienes can include 5-vinyl-2-norbornene; 2,5-norbornadiene; dicyclopentadiene and mixtures thereof.

Non-limiting examples of aromatic ring-containing dienes can include those represented by the following structural formula:

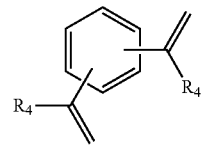

wherein $R_4$ can represent hydrogen or methyl. Aromatic ring-containing dienes can include monomers such as diisopropenyl benzene, divinyl benzene and mixtures thereof.

Examples of diallyl esters of aromatic ring dicarboxylic acids can include but are not limited to those represented by the following structural formula:

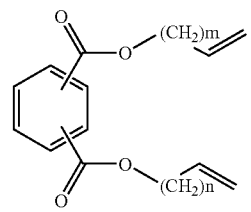

wherein m and n each independently can be an integer from 0 to 5. The diallyl esters of aromatic ring dicarboxylic acids can include o-diallyl phthalate, m-diallyl phthalate, p-diallyl phthalate and mixtures thereof.

Often, the compound (2) having at least two double bonds comprises 5-vinyl-2-norbornene, ethylene glycol divinyl ether, diethylene glycol divinyl ether, triethylene glycol divinyl ether, butane diol divinyl ether, vinylcyclohexene, 4-vinyl-1-cyclohexene, dipentene, terpinene, dicyclopentadiene, cyclododecadiene, cyclooctadiene, 2-cyclopenten-1-yl-ether, 2,5-norbornadiene, divinylbenzene including 1,3-divinylbenzene, 1,2-divinylbenzene, and 1,4-divinylbenzene, diisopropenylbenzene including 1,3-diisopropenylbenzene, 1,2-diisopropenylbenzene, and 1,4-diisopropenylbenzene, allyl (meth)acrylate, ethanediol di(meth)acrylate, 1,3-propanediol di(meth)acrylate, 1,2-propanediol di(meth)acrylate, 1,3-butanediol di(meth)acrylate, 1,2-butanediol di(meth)acrylate, ethylene glycol di(meth)acrylate, diethylene glycol di(meth)acrylate, dimercaptodiethylsulfide di(meth)acrylate, 1,2-ethanedithiol di(meth)acrylate, and/or mixtures thereof.

Other non-limiting examples of suitable di(meth)acrylate monomers can include ethylene glycol di(meth)acrylate, 1,3-butylene glycol di(meth)acrylate, 1,4-butanediol di(meth)acrylate, 2,3-dimethyl-1,3-propanediol di(meth)acrylate, 1,6-hexanediol di(meth)acrylate, propylene glycol di(meth)acrylate, dipropylene glycol di(meth)acrylate, tripropylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxylated neopentyl glycol di(meth)acrylate, pentanediol di(meth)acrylate, cyclohexane dimethanol di(meth)acrylate, and ethoxylated bis-phenol A di(meth)acrylate.

The polythiols suitable for use in material (ii) in the preparation of the polyurethane material in the first component, when reacted with a polyisocyanate (i), can produce a polymerizate having a Martens hardness of at least 20 N/mm$^2$, or often at least 50, or more often between 70 and 200. Such polymerizates are typically not elastomeric; i.e., they are not substantially reversibly deformable (e.g., stretchable) due to their rigidity and do not typically exhibit properties characteristic of rubber and other elastomeric polymers.

Polyamines are also suitable for use in the material (ii) used to prepare the polyurethane material in the first component.

Suitable materials having amine functional groups for use in the material (ii) used to prepare the polyurethane material in the first component may have at least two primary and/or secondary amine groups (polyamine). Non-limiting examples of suitable polyamines include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Non-limiting examples of suitable aliphatic and alicyclic diamines include 1,2-ethylene diamine, 1,2-propylene diamine, 1,8-octane diamine, isophorone diamine, propane-2,2-cyclohexyl amine, and the like. Non-limiting examples of suitable aromatic diamines include phenylene diamines and toluene diamines, for example o-phenylene diamine and p-tolylene diamine. Polynuclear aromatic diamines such as 4,4'-biphenyl diamine, 4,4'-methylene dianiline and monochloro- and dichloro-derivatives of 4,4'-methylene dianiline are also suitable.

Suitable polyamines for use in the present invention can include but are not limited to materials having the following chemical formula:

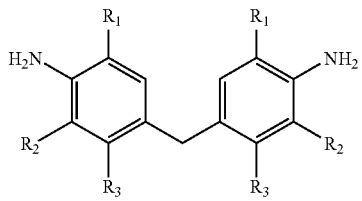

wherein $R_1$ and $R_2$ can each be independently chosen from methyl, ethyl, propyl, and isopropyl groups, and $R_3$ can be chosen from hydrogen and chlorine. Non-limiting examples of polyamines for use in the present invention include the following compounds, manufactured by Lonza Ltd. (Basel, Switzerland):

LONZACURE® M-DIPA: $R_1$=$C_3H_7$; $R_2$=$C_3H_7$; $R_3$=H
LONZACURE® M-DMA: $R_1$=$CH_3$; $R_2$=$CH_3$; $R_3$=H
LONZACURE® M-MEA: $R_1$=$CH_3$; $R_2$=$C_2H_5$; $R_3$=H
LONZACURE® M-DEA: $R_1$=$C_2H_5$; $R_2$=$C_2H_5$; $R_3$=H
LONZACURE® M-MIPA: $R_1$=$CH_3$; $R_2$=$C_3H_7$; $R_3$=H
LONZACURE® M-CDEA: $R_1$=$C_2H_5$; $R_2$=$C_2H_5$; $R_3$=Cl wherein $R_1$, $R_2$ and $R_3$ correspond to the aforementioned chemical formula.

The polyamine can include a diamine reactive compound such as 4,4'-methylenebis(3-chloro-2,6-diethylaniline), (Lonzacure® M-CDEA), which is available in the United States from Air Products and Chemical, Inc. (Allentown, Pa.); 2,4-diamino-3,5-diethyl-toluene, 2,6-diamino-3,5-diethyl-toluene and mixtures thereof (collectively "diethyltoluenediamine" or "DETDA"), which is commercially available from Albemarle Corporation under the trade name Ethacure 100; dimethylthiotoluenediamine (DMTDA), which is commercially available from Albemarle Corporation under the trade name Ethacure 300; 4,4'-methylene-bis-(2-chloroaniline) which is commercially available from Kingyorker Chemicals as MOCA. DETDA can be a liquid at room temperature with a viscosity of 156 cPs at 25° C. DETDA can be isomeric, with the 2,4-isomer range being from 75 to 81 percent while the 2,6-isomer range can be from 18 to 24 percent. The color stabilized version of Ethacure 100 (i.e., formulation which contains an additive to reduce yellow color), which is available under the name Ethacure 100S may be used in the present invention.

Other examples of the polyamine can include ethyleneamines. Suitable ethyleneamines can include but are not limited to ethylenediamine (EDA), diethylenetriamine (DETA), triethylenetetramine (TETA), tetraethylenepentamine (TEPA), pentaethylenehexamine (PEHA), piperazine, morpholine, substituted morpholine, piperidine, substituted piperidine, diethylenediamine (DEDA), and 2-amino-1-ethylpiperazine. In particular embodiments, the polyamine can be chosen from one or more isomers of $C_1$-$C_3$ dialkyl toluenediamine, such as but not limited to 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine, and mixtures thereof. Methylene dianiline and trimethyleneglycol di(para-aminobenzoate) are also suitable.

Additional examples of suitable polyamines include methylene bis anilines, aniline sulfides, and bianilines, any of which may be hetero-substituted, provided the substituents do not interfere with any reactions to take place among the reactants. Specific examples include 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline) and 4,4'-methylene-bis(2,6-diethyl-3-chloroaniline).

Frequently used suitable materials having amine functional groups include isomers of diethylene toluenediamine, methylene dianiline, methyl diisopropyl aniline, methyl diethyl aniline, trimethylene glycol di-para aminobenzoate, 4,4'-methylene-bis(2,6-diisopropylaniline), 4,4'-methylene-bis(2,6-dimethylaniline), 4,4'-methylene-bis(2-ethyl-6-methylaniline), 4,4'-methylene-bis(2,6-diethylaniline), 4,4'-methylene-bis(2-isopropyl-6-methylaniline), and/or 4,4'-methylene-bis(2,6-diethyl-3-chloroaniline). Suitable diamines are also described in detail in U.S. Pat. No. 5,811,506, column 3, line 44, to column 5, line 25, incorporated herein by reference.

In certain embodiments of the present invention the isocyanate functional groups on the material in the first component may be at least partially capped. If isocyanate groups are to be blocked or capped, any suitable aliphatic, cycloaliphatic, or aromatic alkyl monoalcohol or phenolic compound known to those skilled in the art can be used as a capping agent. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethylpyrazole, and amines such as diisopropylamine.

In certain embodiments of the present invention the polyurethane material having isocyanate functional groups in the first component has a number average molecular weight of up to 5000, such as up to 1500, often from 1200 to 1500, as determined by gel permeation chromatography using a polystyrene standard.

The first component may further comprise a solvent. Suitable solvents may include any organic solvents known to those skilled in the art, provided they are not reactive with isocyanate functional groups. Examples are ketones, furans, aromatic solvents, and chlorinated solvents. Suitable solvents can include, but are not limited to: acetone, amyl propionate, anisole, benzene, butyl acetate, cyclohexane, dialkyl ethers of ethylene glycol, e.g., diethylene glycol dimethyl ether and their derivates (sold as CELLOSOLVE® industrial solvents), diethylene glycol dibenzoate, dimethyl sulfoxide, dimethyl formamide, dimethoxybenzene, ethyl acetate, methyl cyclohexanone, cyclopentanone, methyl ethyl ketone, methyl isobutyl ketone, methyl propionate, propylene carbonate, tetrahydrofuran, toluene, xylene, 2-methoxyethyl ether, 3-propylene glycol methyl ether, methylene chloride, and mixtures thereof. The solvent may be present in the first component in an amount of 0 to 95 percent by weight, or 20 to 95 percent by weight, or 20 to 80 percent by weight, or 40 to 60 percent by weight, based on the total weight of the first component. Typically the solvent is present in an amount such that the viscosity of the first component is reduced to a workable viscosity, such as to a viscosity of 10 to 100 cps, for example to 15 to 20 cps.

As previously mentioned, the second component used in the process of the present invention comprises a material having active hydrogen functional groups that are reactive with isocyanate.

Suitable materials having active hydrogen functional groups may include any of those disclosed above as material (ii) in the preparation of the first component, that is, the polyurethane material having isocyanate functional groups. In a particular non-limiting embodiment, the second component comprises a polyamine such as 2,4-diamino-3,5-diethyl-toluene, 2,6-diamino-3,5-diethyl-toluene and mixtures thereof (collectively "diethyltoluenediamine" or "DETDA"), which is commercially available from Albemarle Corporation under the trade name Ethacure 100, as discussed above.

The second component may further comprise a solvent. Suitable solvents may include any of those disclosed above with respect to the first component. The solvent may be present in the second component in an amount of 0 to 95 percent by weight, or 20 to 95 percent by weight, or 20 to 80 percent by weight, or 40 to 60 percent by weight, based on the total weight of the second component.

The equivalent ratio of isocyanate groups (including capped isocyanate groups) in the first component to active hydrogen groups in the second component may range from 2.0:1.0 to 4.0:1.0 such as from 2.5:1.0 depending on the molecular weight of the polyurethane material in the first component.

In step (c) of the method of the present invention, the first component is combined with a portion of the second component to form a second reaction mixture. The portion is less than the total amount of the second component; such as at least 20 percent of the total equivalents of the second component, or 20 to 33 percent of the total equivalents of the second component. A solvent may be added to the second reaction mixture, in addition to or in place of solvents in either or both of the individual components. The solvent may be any of those disclosed above. The solvent may be present in the -second reaction mixture in an amount of 0 to 95 percent by weight, or 20 to 95 percent by weight, or 20 to 80 percent by weight, or 40 to 60 percent by weight, based on the total weight of the reaction mixture.

In certain embodiments of the present invention, the reaction mixture may further comprise a surfactant. Suitable surfactants may include those sold under the name Modaflow®, available from Solutia, Inc.; BYK-307® and BYK-377®, available from BYK-Chemie; and/or Multiflow®, available from Cytec Surface Specialties. The surfactant may be present in the reaction mixture in an amount of up to 0.2 percent by weight, or up to 0.1 percent by weight, or up to 0.07 percent by weight, based on the total weight of resin solids in the reaction mixture.

If appropriate, the reaction mixture may further comprise a catalyst. Suitable catalysts can be selected from those known in the art. Non-limiting examples can include tertiary amine catalysts such as but not limited to triethylamine, triisopropylamine, dimethyl cyclohexylamine, N,N-dimethylbenzylamine and mixtures thereof. Such suitable tertiary amines are disclosed in U.S. Pat. No. 5,693,738 at column 10, lines 6-38, the disclosure of which is incorporated herein by reference. Other suitable catalysts include phosphines, tertiary ammonium salts, organophosphorus compounds, tin compounds such as dibutyl tin dilaurate, or mixtures thereof, depending on the nature of the various reactive components.

After the first and second components are combined to form the first reaction mixture, the first reaction mixture is allowed to react for a time sufficient to increase the viscosity of the reaction mixture to at least 300 centipoise per second (cps), such as at least 500 cps, or at least 1000 cps, or at least 5000 cps, or at least 10,000 cps, in step (d) of the method of the present invention. Such reaction times may be at least 120 minutes (2 hours), but the reaction time may be indefinite (e.g., days or weeks) without detrimental effect to the reaction mixture, provided the solvents are not permitted to evaporate to an appreciable extent. Step (d) of the process typically takes place at ambient temperature, but elevated temperatures may be employed.

In step (e) of the process of the present invention, the remainder of the second component is added to the first reaction mixture to form a second reaction mixture. The reaction mixture may be immediately formed into a film such as by dispensing onto a support substrate such as in a conventional solvent casting process. Suitable film-forming techniques include: formation of films by casting the film onto a casting roll after extrusion through a flat film-forming die, formation of films by the "blown film" technique wherein a film-forming composition is forced through a circular die and the exiting circular film profile is expanded by compressed air, casting a film-forming composition into a billet or other solid form and subsequently skiving the film from the formed billet, as well as other techniques known in the art. Of these techniques, commonly used methods for the production of film include film casting techniques and the production of film by blown film techniques.

It should further be mentioned that other commonly used additives can be included in the first and/or second reaction mixtures. Such additives can include but are not limited to light stabilizers, heat stabilizers, antioxidants, ultraviolet light absorbers, mold release agents such as ZELEC®UN available from Stepan Company, static (non-photochromic) dyes, pigments and flexibilizing additives.

Support substrates onto which the reaction mixture is cast have smooth surfaces and may comprise, for example, glass, stainless steel, and the like, as well as polymeric substrates for example, polyethyleneterephthalate, polyimide, or silicone, provided the material from which the substrate is made can withstand the subsequent curing temperatures.

The reaction mixture is dispensed onto the support substrate to form a substantially uniform thickness to yield a dry film thickness of 0.5 to 20 mils (12.7 to 508 microns), or 1 to 10 mils (25.4 to 254 microns), or 2 to 4 mils (50.8 to 101.6 microns) after cure.

After application of the reaction mixture to the substrate, an at least partial film is formed on the surface of the substrate by driving solvents out of the film by mild heating or by an air-drying period, typically involving exposure to ambient conditions for about 1 to 20 minutes. The film on the substrate is then heated to a temperature and for a time sufficient to yield a cured film. In the curing operation, solvents are driven off and the reactive functional groups in the reaction mixture are reacted together. In the making of a polyurethane-urea film, for example, the heating or curing operation may be carried out at a temperature in the range of from 100° to 210° C. for a period of 10 to 100 minutes. At this temperature range, reaction mixtures containing polyurethane materials as a first component having number average molecular weights of up to 1500 can cure within 40 to 70 minutes. In alternate embodiments, curing may be carried out at a lower temperature range of ambient (for example 25° C.) to 100° C. for a longer time period of from 100 minutes to five days. Cure temperatures and dwell times will be dependent on the nature of the reactants, including type of reactive groups, the presence of any catalysts, etc.

After an effective curing operation, the cured film may be removed from the support substrate to yield a free film. The resulting cured, non-elastomeric polyurethane-containing film typically is non-birefringent. In certain embodiments, the film may be capable of demonstrating a stress at break of at least 9000 psi, and a strain at break of at least 70 percent, as determined using an Instron model 5543 tensile tester.

The cured, non-elastomeric polyurethane-containing film prepared according to the method of the present invention may be used as one or more of the protective and/or support film layers in a polarizing optical element for use in a multi-layer optical article such as a liquid crystal display (LCD).

The present invention is more particularly described in the following examples that are intended as illustration only, since numerous modifications and variations therein will be apparent to those skilled in the art.

EXAMPLES

Examples 1A-B, 2, 3A-E, 4A-E, 5A-D, and 6A-D included the amine diethyl toluene diamine (DETDA) at varying concentrations in different solutions of TRIVEX® AH resin. Control Examples 1 and 2 were without amine and Comparative Examples 1 and 2A-F included DETDA at a lower level or different amines.

Solutions of TRIVEX® AH resin, without stabilizers and commercially available from PPG Industries, Inc., in methylene chloride having the weight percent and amount listed in Table 1 were added to clean screw-capped glass containers. The following amines were added in the amounts specified to yield the number of equivalents (Equiv) listed in Table 1: the aromatic diamines—diethyl toluene diamine (DEDTA), 4,4'methylene-bis-(2,6-diethylaniline) (MBDA), and 4,4'-methylene-bis-(o-chloroaniline) (MOCA); the aliphatic diamine—Isophorone diamine (IPDA); and the monofunctional amine—aniline (MA).

The resulting mixtures were shaken 15 to 20 times and left standing at room temperature except on the days indicated in Table 2 when samples were taken for viscosity testing. On those days the samples were shaken in the same manner. Samples prepared and tested on the same day are grouped within the horizontal bold lines of Tables 1 and 2.

Viscosity testing was done with 1 mL of sample applied to the plate of a Brookfield Cap 2000+Viscometer according to the operating instructions of Manual No. MO2-31380707. The temperature of the plate was set at 25° C. and the spindle was lowered. The spindle was rotated at speeds and times ranging from 10 rpm for 60 seconds for viscous materials to 1000 rpm for 30 seconds for less viscous materials. The viscosity of Comparative Examples 2C and 2E could not be measured since the samples gelled. The results in Centipoise (cP) are reported in Table 2A for days 0 through 6 and in Table 2B for days 7 through 36.

TABLE 1

| Sample Description | | | | |
|---|---|---|---|---|
| Sample ID | Amine | Amount (grams) | Equiv. | Weight Percent TRIVEX ® AH in Methylene Chloride (Total Weight in grams) |
| Control-1 | NONE | 0 | 0 | 50 (100) |
| Ex 1A | DETDA | 1.334 | 10 | 50 (100) |
| Ex 1B | DETDA | 2.000 | 15 | 50 (100) |
| CE-1 | DETDA | 0.667 | 5 | 50 (100) |
| Control-2 | NONE | 0 | 0 | 33 (100) |
| Ex 2 | DETDA | 1.780 | 15 | 33 (100) |
| CE-2A | DETDA | 0.445 | 5 | 33 (100) |
| CE-2B | DETDA | 0.890 | 10 | 33 (100) |
| Ex 3A | DETDA | 0.68 | 25 | 20 (50) |
| Ex 3B | DETDA | 0.74 | 27 | 20 (50) |
| Ex 3C | DETDA | 0.79 | 29 | 20 (50) |
| Ex 3D | DETDA | 0.85 | 31 | 20 (50) |
| Ex 3E | DETDA | 0.90 | 33 | 20 (50) |
| Ex 4A | DETDA | 0.51 | 25 | 14.9 (50) |
| Ex 4B | DETDA | 0.55 | 27 | 14.9 (50) |
| Ex 4C | DETDA | 0.59 | 29 | 14.9 (50) |
| Ex 4D | DETDA | 0.63 | 31 | 14.9 (50) |
| Ex 4E | DETDA | 0.67 | 33 | 14.9 (50) |
| Ex 5A | DETDA | 0.79 | 29 | 20 (50) |
| Ex 5B | DETDA | 0.82 | 30 | 20 (50) |
| Ex 5C | DETDA | 0.85 | 31 | 20 (50) |
| Ex 5D | DETDA | 0.88 | 32 | 20 (50) |
| Ex 6A | DETDA | 0.63 | 31 | 14.9 (50) |
| Ex 6B | DETDA | 0.67 | 33 | 14.9 (50) |

TABLE 1-continued

Sample Description

| Sample ID | Amine | Amount (grams) | Equiv. | Weight Percent TRIVEX ® AH in Methylene Chloride (Total Weight in grams) |
|---|---|---|---|---|
| Ex 6C | DETDA | 0.71 | 35 | 14.9 (50) |
| Ex 6D | DETDA | 0.75 | 37 | 14.9 (50) |
| CE-2C | MBDA | 2.98 | 20 | 33 (50) |
| CE-2D | MOCA | 2.57 | 20 | 33 (50) |
| CE-2E | IPDA | 1.63 | 20 | 33 (50) |
| CE-2F | MA | 1.79 | 20 | 33 (50) |

TABLE 2A

| Sample ID | Day 0 | Day 1 | Day 2 | Day 3 | Day 4 | Day 5 | Day 6 |
|---|---|---|---|---|---|---|---|
| Control-1 | 46.5 | 44.3 | 56.3 | — | — | 31.5 | 57.8 |
| Ex 1A | 56.3 | 340.5 | 336.8 | — | — | 393.0 | 479.3 |
| Ex 1B | 76.5 | 3930.0 | 5940.0 | — | — | 6997.0 | 5520.0 |
| CE-1 | 43.5 | 86.3 | 104.3 | — | — | 99.8 | 77.2 |
| Control-2 | 29.3 | 42.8 | — | — | 13.5 | 20.3 | 14.2 |
| Ex 2 | 36.0 | 2528.0 | — | — | 4635.0 | 5115.0 | 9360.0 |
| CE-2A | 18.5 | 16.5 | — | — | 15.0 | 18.8 | 27.8 |
| CE-2B | 24.0 | 48.8 | — | — | 120.7 | 133.5 | 168.0 |
| Ex 3A | — | 142.5 | 404.3 | 547.0 | 1130.0 | — | — |
| Ex 3B | — | 224.3 | 572.3 | 1204.0 | 2328.0 | — | — |
| Ex 3C | — | 229.5 | 991.0 | 4582.0 | 2947.0 | — | — |
| Ex 3D | — | 1821.0 | 7500.0 | 8895.0 | 30450 | — | — |
| Ex 3E | — | 2328.0 | 8175.0 | 10455 | 23850 | — | — |
| Ex 4A | — | 27.0 | 96.0 | 108.0 | 156.0 | — | — |
| Ex 4B | — | 48.0 | 131.3 | 312.0 | 496.0 | — | — |
| Ex 4C | — | 139.5 | 210.7 | 500.0 | 1021.0 | — | — |
| Ex 4D | — | 75.8 | 210.0 | 267.0 | 504.0 | — | — |
| Ex 4E | — | 114.0 | 4207.0 | 6180.0 | 5010.0 | — | — |
| Ex 5A | — | 129.0 | 200.0 | 1635.0 | 457.0 | — | — |
| Ex 5B | — | 536.0 | 2745.0 | 4830.0 | 5865.0 | — | — |
| Ex 5C | — | 935.0 | 4508.0 | 15300 | 13050 | — | — |
| Ex 5D | — | 3112.0 | 5430.0 | 20625 | 28950 | — | — |
| Ex 6A | — | 237.0 | 273.0 | 458.0 | 631.0 | — | — |
| Ex 6B | — | 93.0 | 266.0 | 432.0 | 620.0 | — | — |
| Ex 6C | — | 223.5 | 648.0 | 3682.0 | 3697.0 | — | — |
| Ex 6D | — | 304.0 | 1020.0 | 3855.0 | 6097.0 | — | — |
| CE-2C | * | — | — | — | — | — | — |
| CE-2D | 23.0 | 40.0 | — | — | — | — | — |
| CE-2E | ** | — | — | — | — | — | — |
| CE-2F | — | 30.8 | — | — | — | — | — |

* Gelled within 2 hours.
** Gelled instantly.

TABLE 2B

| Sample ID | Day 7 | Day 8 | Day 9 | Day 18 | Day 19 | Day 20 | Day 21 | Day 36 |
|---|---|---|---|---|---|---|---|---|
| Control-1 | 60.7 | 69 | — | — | 87.7 | — | 74.3 | — |
| Ex 1A | 440.3 | 501.8 | — | — | 731.0 | — | 618.8 | — |
| Ex 1B | 7200.0 | 7260.0 | — | — | 6990.0 | — | 10080 | — |
| CE-1 | 90.0 | 97.5 | — | — | 157.5 | — | 132.0 | — |
| Control-2 | 24.7 | — | — | 14.2 | — | 21.7 | — | 16.5 |
| Ex 2 | 8745.0 | — | — | 11490 | — | 70650 | — | 43500 |
| CE-2A | 42.0 | — | — | 25.5 | — | 35.3 | — | 62.2 |
| CE-2B | 137.2 | — | — | 133.0 | — | 126.8 | — | 116.3 |
| Ex 3A | 3225.0 | 3795.0 | 4282.0 | — | — | — | — | — |
| Ex 3B | 4177.0 | 5085.0 | 5745.0 | — | — | — | — | — |
| Ex 3C | 4950.0 | 10650 | 23550 | — | — | — | — | — |
| Ex 3D | 41175 | 39450 | 43650 | — | — | — | — | — |
| Ex 3E | 52650 | 51225 | 62700 | — | — | — | — | — |
| Ex 4A | 223.0 | 323.0 | 319.0 | — | — | — | — | — |
| Ex 4B | 1168.0 | 2445.0 | 3773.0 | — | — | — | — | — |
| Ex 4C | 5242.0 | 5085.0 | 17850.0 | — | — | — | — | — |
| Ex 4D | 1807.0 | 2955.0 | 5700.0 | — | — | — | — | — |
| Ex 4E | 16800 | 32400 | 47850 | — | — | — | — | — |
| Ex 5A | 1222.0 | — | — | — | — | — | — | — |
| Ex 5B | 16800 | — | — | — | — | — | — | — |
| Ex 5C | 26475 | — | — | — | — | — | — | — |
| Ex 5D | 38700 | — | — | — | — | — | — | — |
| Ex 6A | 1257.0 | — | — | — | — | — | — | — |
| Ex 6B | 952.0 | — | — | — | — | — | — | — |
| Ex 6C | 5707.0 | — | — | — | — | — | — | — |
| Ex 6D | 21375 | — | — | — | — | — | — | — |
| CE-2C | — | — | — | — | — | — | — | — |
| CE-2D | 18.0 | — | — | — | — | — | — | — |
| CE-2E | — | — | — | — | — | — | — | — |
| CE-2F | 28.5 | — | — | — | — | — | — | — |

Whereas particular embodiments of this invention have been described above for purposes of illustration, it will be evident to those skilled in the art that numerous variations of the details of the present invention may be made without departing from the invention as defined in the appended claims.

What is claimed is:

1. A method of preparing a cured, non-elastomeric polyurethane urea-containing film comprising the steps of:

(a) providing a first component comprising a polyurethane material having isocyanate functional groups;

(b) providing a second component comprising a polyamine material having amino active hydrogen functional groups that are reactive with isocyanate;

(c) combining the first component with a portion of the second component to form a first reaction mixture;

(d) allowing the first reaction mixture to react for a time sufficient to increase the viscosity of the reaction mixture to at least 300 cps;

(e) adding the remainder of the second component to the first reaction mixture to form a second reaction mixture;

(f) dispensing the second reaction mixture onto a support substrate in a substantially uniform thickness to form an at least partial film thereon, using a film-forming technique selected from:
(i) extrusion through a flat film-forming die;
(ii) a blown film technique wherein the second reaction mixture is forced through a circular die to form an exiting circular film profile and the exiting circular film profile is expanded by compressed air; and
(iii) casting the second reaction mixture into a billet;

(g) heating the film on the support substrate to a temperature and for a time sufficient to yield a cured film; and (h) removing the cured film from the support substrate to yield a non-elastomeric, polyurethane urea-containing free film, wherein the dry film thickness of the cured free film is 0.5 to 20 mils (12.7 to 508 microns).

2. The method of claim 1 wherein the first component and/or the second component further comprises a solvent.

3. The method of claim 2 wherein the solvent is present in the first component in an amount of 20 to 95 percent by weight, based on the total weight of the first component.

4. The method of claim 2, wherein the solvent comprises a ketone, tetrahydrofuran, toluene, and/or a chlorinated solvent.

5. The method of claim 2, wherein the solvent comprises methylene chloride.

6. The method of claim 1 wherein the second component further comprises a solvent.

7. The method of claim 6 wherein the solvent is present in the second component in an amount of 20 to 95 percent by weight, based on the total weight of the second component.

8. The method of claim 1 wherein the reaction mixture further comprises a surfactant.

9. The method of claim 1 wherein the reaction mixture further comprises a catalyst.

10. The method of claim 1 wherein the isocyanate functional groups on the material in the first component are at least partially capped.

11. The method of claim 1 wherein the polyurethane material having isocyanate functional groups in the first component has a number average molecular weight of up to 5000.

12. The method of claim 11 wherein the polyurethane material having isocyanate functional groups in the first component has a number average molecular weight of 1200 to 1500.

13. The method of claim 1 wherein the portion of the second component used in step (c) is a portion of at least 20 percent of the total equivalents of the second component.

14. The method of claim 1 wherein the polyamine material having amino active hydrogen functional groups in the second component comprises diethyl toluenediamine, methylene dianiline, methyl diisopropyl aniline, methyl diethyl aniline, trimethylene glycol di-para aminobenzoate, 4,4'-methylene-bis(2,6-diisopropylaniline), 4,4'-methylene-bis(2,6-dimethylaniline), 4,4'-methylene-bis(2-ethyl-6-methylaniline), 4,4'-methylene-bis(2,6-diethylaniline), 4,4'-methylene-bis(2-isopropyl-6-methylaniline), and/or 4,4'-methylene-bis(2,6-diethyl-3-chloroaniline).

15. The method of claim 1 wherein the reaction mixture is allowed to react in step (d) for at least 120 minutes.

16. The method of claim 1 wherein the film is heated in step (g) to a temperature of 100° to 210° C. for 10 to 100 minutes.

17. The method of claim 16 wherein the film is heated in step (g) to a temperature of 100° to 210° C. for 40 to 70 minutes.

18. The method of claim 1 wherein the film is heated in step (g) to a temperature of 25° to 100° C. for 100 minutes to five days.

* * * * *